United States Patent [19]

Schrenk

[11] Patent Number: 5,511,023
[45] Date of Patent: Apr. 23, 1996

[54] METHOD AND CIRCUIT CONFIGURATION FOR DEBITING A DEBIT CARD

[75] Inventor: Hartmut Schrenk, Haar, Germany

[73] Assignee: Siemens Aktiengesellschaft, Munich, Germany

[21] Appl. No.: 240,928

[22] Filed: May 10, 1994

[30] Foreign Application Priority Data

May 10, 1993 [DE] Germany ............... 43 15 542.1

[51] Int. Cl.$^6$ ................................................ G11C 7/00
[52] U.S. Cl. ................... 365/189.01; 365/185.09; 365/201; 365/218; 365/236; 235/492
[58] Field of Search ................... 235/492, 462; 365/201, 218, 189.01, 185, 236

[56] References Cited

U.S. PATENT DOCUMENTS

| | | | |
|---|---|---|---|
| 5,001,332 | 3/1991 | Schrenk | 235/492 |
| 5,285,415 | 2/1994 | Depret et al. | 365/189.01 |
| 5,383,147 | 1/1995 | Saneritsu | 235/492 X |
| 5,410,714 | 4/1995 | Yorimoto et al. | 235/492 X |
| 5,420,412 | 5/1995 | Kowalski | 235/492 |

FOREIGN PATENT DOCUMENTS 0321727  6/1989  European Pat. Off. .
0519847  12/1992  European Pat. Off. .

Primary Examiner—Do Hyun Yoo
Attorney, Agent, or Firm—Herbert L. Lerner; Laurence A. Greenberg

[57] ABSTRACT

A debit card carries an integrable electronic circuit which is electronically debited. The circuit includes a nonvolatile, electrically erasable and writable memory operated as a multi-stage counter with counter stages. The circuit is provided with a nonvolatile, electrically erasable and writable check memory which has check memory regions associated with respective counter stages of the counter memory. The card is debited in that at least one of the memory cells of a memory is read out with at least two different weighting thresholds, and the counter memory is controlled as a function of the results obtained in that reading. The reading of the carry bit and the associated check bit allow to safely prevent against manipulation and the circuit may be realized at a very low expense.

9 Claims, 1 Drawing Sheet

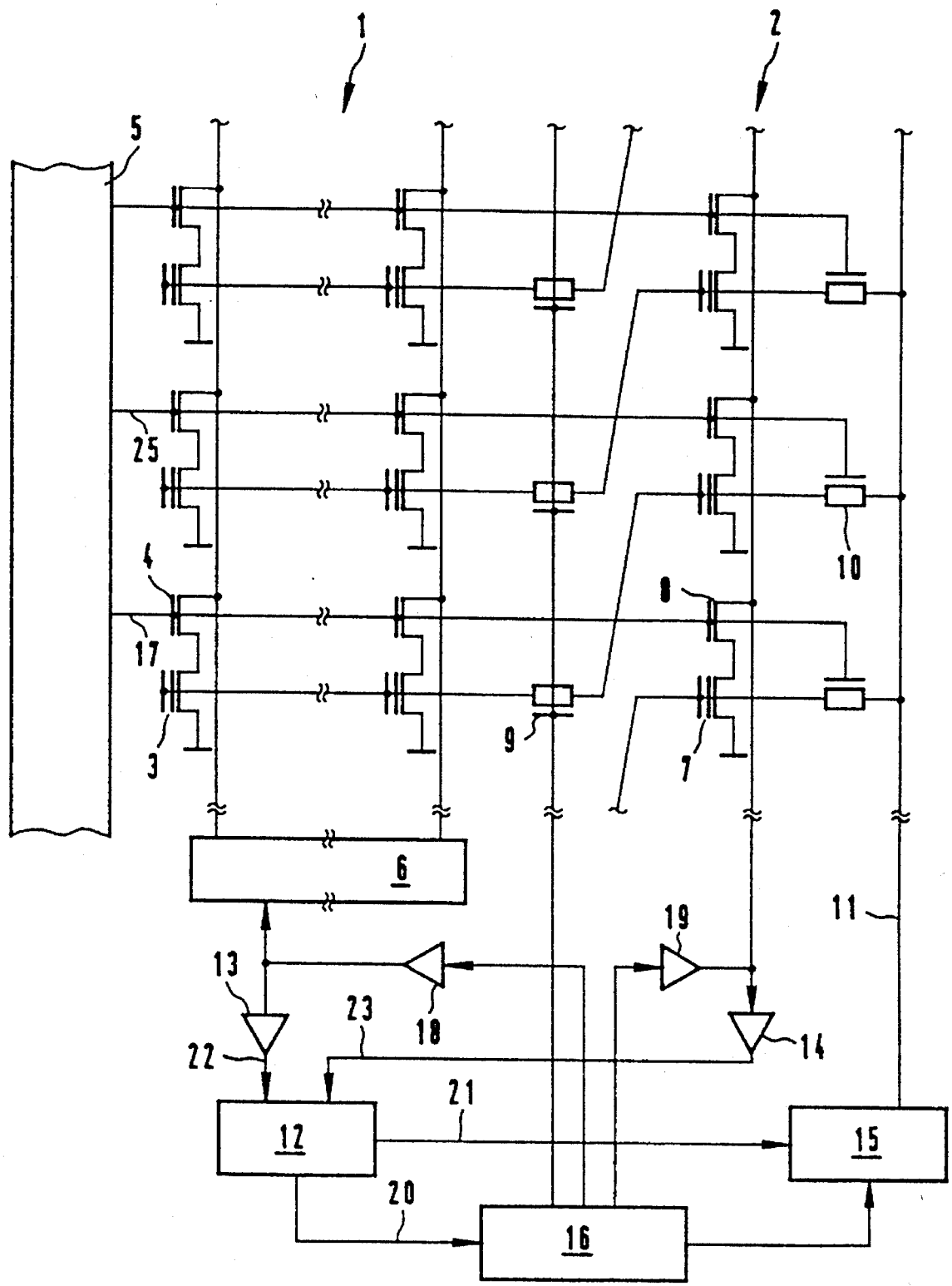

METHOD AND CIRCUIT CONFIGURATION FOR DEBITING A DEBIT CARD

BACKGROUND OF THE INVENTION

1. Field of the Invention

The invention relates to a method for debiting an integrable electronic circuit of a debit card, which contains a nonvolatile, electrically erasable and writable memory that is operated as a multi-stage counter, and which contains a nonvolatile, electrically erasable and writable check memory that has check memory regions associated with the counter stages.

The invention also relates to a circuit configuration for performing the method, having a nonvolatile, electrically erasable and writable memory, which is subdivided into subregions of varying order or significance, and in which control is exerted by circuitry means so that each subregion is erased only whenever a carry bit is written into a previously unwritten memory cell of the subregion of the next-higher order, and having a nonvolatile, electrically erasable and writable check memory, in which one bit is associated with one subregion, and in which control is exerted by circuitry means so that a memory cell of the check memory is written whenever a memory cell of the associated subregion of the memory is written, and is erased whenever the next lesser-order subregion of the memory is erased.

Debit cards are prepaid data carriers which enable payment for goods or charged services, such as telephone calls. These chip cards contain as their essential element a nonvolatile electronic data memory, in which data, such as an amount of money, are stored. The data memory is typically a nonvolatile, electronically writable and erasable memory, of the EEPROM type.

The memory is subdivided into subregions, which are assigned variable order or significance. When the memory is debited, the memory cells are first written in accordance with the units consumed in the lowest-order subregion. Once all the memory cells of one subregion have been written, a carryover to the next-higher subregion takes place, in that an as yet unwritten memory cell is written there, and the lower-order subregion is erased. Once again, then, all the erased memory cells contained in it can be debited or in other words written. In other words, the memory is used as a multistage counter. If the process is interrupted during the course of processing for a carryover, for instance by equipment failure or by violent removal of the chip card from the service-providing equipment, the card can assume a state in which the carryover has already been written into the higher-order subregion of the memory while the lower-order region has not yet been erased.

It is therefore proposed in European published patent application EP 0 519 847 (corresponding to U.S. Pat. No. 5,285,415) that a second, identical counting memory be used, in the counting regions of which the write data of the first counting region are buffer-stored for checking and security purposes. If there is an interruption, it can be ascertained whether the lower-level counter region for a written transfer bit had already been properly erased. The result is better protection to the user against losing money (card debiting) in the case of malfunctions. However, this is attained at a relatively high cost with regard to circuitry for the ghost memory region and the corresponding addressing and control logic. Moreover, variations in terms of production tolerances can cause discrepancies between the two memories, for instance with respect to the magnitude of the programming voltages and the attendant varying programming speeds in the two memories. This can be disadvantageous both to the service provider and to the user. In particular, a card can be intentionally used improperly, by erasing a counter region before a transfer bit has been written.

SUMMARY OF THE INVENTION

It is accordingly an object of the invention to provide a method and circuit configuration for debiting a debit card, which overcomes the hereinafore-mentioned disadvantages of the heretofore-known methods and devices of this general type and which allows debiting a debit card at a lower expense for circuitry, and in which the user is protected against improper debiting if there is an interruption, yet reliable protection against improper manipulation is achieved.

With the foregoing and other objects in view there is provided, in accordance with the invention, a method for debiting an integrable electronic circuit of a debit card, wherein the electronic circuit comprises a nonvolatile, electrically erasable and writable counter memory operated as a multi-stage counter with counter stages, and wherein the electronic circuit further comprises a nonvolatile, electrically erasable and writable check memory having check memory regions associated with respective counter stages of the counter memory. The method comprises reading-out at least one memory cell of a memory with at least two different weighting thresholds, and controlling a counting process as a function of the results obtained in the reading step.

In other words, the object is attained for the method in that the contents of at least one memory cell of the memories are read with at least two different weighting thresholds, and the counting process is controlled as a function of the results of the reading.

In such a method, it is possible for a check memory region with only a single bit to be associated with a counting region. Addressing of the check memory is done simultaneously with the addressing of the associated counter region, so that no significant additional expense for circuitry is needed for addressing the check memory.

In accordance with an .added mode of the invention, the different weighting thresholds are defined by supplying different reading voltages to the control gate of a nonvolatile memory cell.

In accordance with an additional mode of the invention, the method includes an evaluating step performed by reading at a first reading voltage prior to writing a carry bit and an associated check bit, and reading at a second reading voltage prior to erasing a low-order counter stage and the associated check bit.

One possible improper manipulation of the counting data could be the application of brief writing pulses to the counting memory and the check bit, and various memory cells in the counting memory could also be addressed. The cumulative effect of this could be that the check bit is written while the counting memory is not. This would make it possible for the corresponding lower-order counter region of the counting memory to be erased afterward without a carryover having been written into the next-higher counter region.

This kind of possible manipulation is precluded, however, by weighting the contents of at least one memory cell, i.e. preferably a carry bit and the associated check bit, according to the invention with at least two different weighting thresholds. This provision in fact makes it possible to ascertain whether a brief improper writing pulse is present which, while adequate for writing in the check bit because of the cumulative effect, is not adequate for writing in the counter memory region. By suitable control, the writing process for the carry bit and the check bit and the ensuing process of erasure for the check bit and the lower-order counter region can be controlled in such a way that the debit card is either blocked or debited.

In accordance with a further mode of the invention, the circuit is provided with memory cells of the n-channel type with a floating gate, and the method further comprises adjusting the first reading voltage higher than the second reading voltage. Typically, n-channel transistors are used for the EEPROM cells of the counter memory and the check memory. A first n-channel transistor has a floating gate by which the threshold voltage of the transistor is programmable. One terminal of the drain-to-source path of the first transistor is connected to a reference potential; a further terminal is connected to a reading line via the drain-to-source path of a second n-channel transistor without a floating gate. The gate electrode of the second transistor is controlled by a selection signal. A memory cell is written by means of the first transistor when the control gate is at low potential and the drain terminal—the selection transistor is made conducting—is switched to programming potential, such as 20 V. The memory cell is erased by switching the control gate to erase potential, such as 20 V. If a reading voltage is applied to the control gate, a conducting first transistor indicates the written state, while a blocked transistor indicates the erased state. If the threshold voltage is relatively high, then the transistor is strongly erased, which leads to the conclusion that the memory state was brought about by a proper erase pulse. If the threshold voltage is relatively low yet still above a mean value, then the conclusion can be drawn that the memory cell was only weakly erased, which can be ascribed for instance to some manipulation. Once again, a very low threshold voltage indicates a properly written state, while a threshold voltage that is not so low indicates a state that might have been achieved by manipulation.

Various weighting thresholds in reading are generated by a variable control gate voltage. With a mean control gate voltage, one can distinguish only between a mean erased state and the written state. With a control gate voltage which is above the mean control gate voltage, one can also distinguish between a strongly erased and a weakly erased state. Correspondingly, with a control gate voltage below the mean control gate voltage, one can distinguish between a weakly and a strongly written state.

According to the invention, before a writing phase for a carryover, or in other words when a carry bit is to be written into a higher-order counter region and a check bit is to be written into the check memory, weighting is done with a first reading voltage, which in the case of the n-channel EEPROM cells indicated here is preferably higher than the mean reading voltage. Moreover, before an erasure phase, or in other words if the check bit and the corresponding lower-order counter region are to be erased, the weighting is carried out with a second control gate voltage, which in the case of n-channel EEPROM cells is preferably below the mean reading voltage. It can then be decided whether the memory cells have been strongly erased or written, or in other words whether proper writing and erasure processes have been carried out, or whether the memory cells are weakly erased or written, which can be ascribed to a deceptive manipulation.

In accordance with yet another mode of the invention, the memory cells are read-out at a mean weighting threshold when output is provided to the user. As a result, it remains concealed to anyone dealing deceptively that work is done internally of the integrated circuit of the debit card at different weighting thresholds. The mean reading voltage is suitably the reading voltage which is also typically employed in state-of-the-art debit cards, or in other words those that lack reversible reading voltages. For the sake of simplifying the circuitry, the first reading voltage for weighting prior to a writing phase and the reading voltage for some other reading operation, such as for output to the user, may be the same and may be at the conventional reading voltage of the state-of-the-art. In that case, the second reading voltage for weighting prior to the erasure phase is lower than that.

Four distinct possibilities result from the evaluating step, namely the different combinations in which the carry bit and the check bit are written or erased. Firstly, if the carry bit and the check bit are evaluated in the evaluating step as having been written, the writing process for the carry bit and the check bit during a writing phase is suppressed. Secondly, if either the carry bit or the check bit are evaluated as having been written, a writing process for the check bit during a writing phase is suppressed. Thirdly, if either the carry bit or the check bit are evaluated as having been written, a writing process for the check bit is suppressed and the check bit is erased during a writing phase. Finally, if the carry bit is erased and the check bit is written, a writing process for the check bit during a writing phase is suppressed and the carry bit is written.

Accordingly, deceptive manipulation may be detected, among other possible procedures, by ascertaining the memory state by reading prior to the writing phase and reading prior to the erase phase for the carry bit and the check bit. For the first of these reading operations, reading is done at a reading voltage that is higher, preferably above the mean reading voltage, while in the latter of these reading operations reading is done at a lower reading voltage, preferably below the mean reading voltage.

If it is found in the first reading operation prior to the writing phase that both the carry bit and the check bit are erased (and the counter is to be upwardly counted for debiting a value unit), then both bits are written. If in the ensuing reading operation prior to the writing phase it is ascertained that both bits are written, then the normal case is involved; the check bit and the lower-order counter subregion can be erased.

If it is found in the reading operation before the writing phase that both the carry bit and the check bit are written, then no writing is done in the writing phase. If in the reading operation prior to the erase phase the same result is found, then the check bit and the lower-order counter subregion are erased. This is the case if an interruption occurs during a writing operation yet no deceptive manipulation has occurred.

If in the reading operation prior to the writing phase, different states are found for the carry bit and the check bits (if one is erased and the other is written, or the first is written and the other is erased, respectively), then these states were the result of deceptive manipulation. In that case one of the bits has already flipped over as a result of the cumulative effect but the other has not yet done so. The next writing operation is then suppressed by circuitry logic. The card would thus be blocked to further manipulation. Suitably, however, the circuit logic can be embodied such that in the event that the carry bit is cancelled and the check bit is written, only the check bit is erased, or only the carry bit is written. This debits the card, so that the advantage possibly attainable by the manipulation is reliably forfeited.

In the reading operation before the erase phase, only those states in which both the carry bit and check bit are simultaneously in either the written or the erased condition occur. In the first case, as described above, the procedure continues with erasure of the check bit and of the lower-order counter subregion. In the second case, there is no condition for an erase procedure. Preferably, for the sake of security, only the already-erased check bit can then be erased once again.

In order to achieve a highest-possible degree of compatability of the debit cards and of the method according to the invention with those of the prior art (which have no chack memory and control process circuitry), the process control provisions and the check memory may be turned off. They are first disabled and are switched to active only after a command from the part of the service equipment that communicates with the card. This can be done, for instance, with a write command to a fixed address of the card, by means of which the process control provisions and the check memory are enabled.

With the foregoing and other objects in view there is also provided, in accordance with the invention, an integrable electronic circuit configuration of a debit card, comprising: a nonvolatile, electrically erasable and writable counter memory, the memory having memory cells and being divided into subregions of varying order; circuit switch means operatively connected to the memory cells of the subregions for erasing each subregion only whenever a carry bit is written into a previously unwritten memory cell of the subregion of a next-higher order; a nonvolatile, electrically erasable and writable check memory, the check memory having check memory cells and one bit associated with one subregion; circuit switch means operatively connected with the check memory cells for writing one of the check memory cells whenever one of the memory cells of an associated subregion of the counter memory is written, and for erasing the check memory cell whenever a next-lesser-order subregion of the counter memory is erased; control means connected to the memory cells for providing at least two different control gate voltages for the memory cells; decoder means connected to data signal lines of the memory cells for evaluating memory states of addressed memory cell of the counter memory and of the check memory; control means connected between a control gate of the one memory cell of the check memory and a control gate of the next-lesser-order subregion of the counter memory, for electrically separating the control gate of the one memory cell from the control gate of the next-lesser-order subregion of the counter memory; and a process control device connected to and controlling an operation of the control means.

In accordance with a concomitant feature of the invention, the one memory cell of the check memory is a single memory cell associated with each subregion of the counter memory.

The circuit configuration attains the object with a special control, with which at least two different control gate voltages for the memory cells are generated; further with a decoder, which is connected to data signal lines of the memory cells, and by which memory states of an addressed memory cell of the counter memory and of the check memory are evaluated; and further with a process control device actuating control means which allow connecting and separating the control gate of a memory cell of the check memory and the control gate of the next-lesser-order subregion of the counter memory.

Other features which are considered as characteristic for the invention are set forth in the appended claims.

Although the invention is illustrated and described herein as embodied in a method and circuit configuration for debiting a debit card, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single Figure of the drawing.

BRIEF DESCRIPTION OF THE DRAWING

The single Figure is a partial, diagrammatic illustration of a circuit configuration according to the invention.

DESCRIPTION OF THE PREFERRED EMBODIMENTS

Referring now to the drawing in detail, a counting memory 1 is subdivided into memory segments of various significance, with one memory segment corresponding to one memory cell line shown. Each memory cell includes an n-channel transistor 3 with a floating gate and an n-channel selection transistor 4, which are connected and switched as indicated above. A memory cell is addressed line by line via an address decoder 5 and column by column via a column decoder 6.

One memory cell of a check memory 2 or control memory 2 is associated with each line. The selection transistor of a memory cell of the check memory is triggered by the same selection line 17 as the associated line of the counting memory 1. Each memory cell of the check memory 2 includes an n-channel transistor 7 with a floating gate and an evaluation transistor 8, which are switched as outlined above. The control gate terminals of the transistors 3 of one line of the memory 1 are thereby each connected via a respective transfer transistor 9, of the depletion type, with the gate terminal of the next-higher order memory cell of the check memory 2. This control gate terminal is also connected to a line 11 via a further transfer transistor 10 of the depletion type. The gate terminal of the transistor 10 is connected to the selection line 25 of this higher-order memory cell.

The circuit configuration includes the following further logic circuits for control: a decoder 12, with which the output read signals of a read line of the memory 1, and of the read line of the memory 2, amplified via the read amplifiers 13 and 14, respectively, are processed; a setting or adjuster device 15, by which the appropriate reading and programming voltages for the control gates of the memory cells are furnished at the proper time along the line 11; a write/erase process control 16, by which the programming voltages are furnished via programming amplifiers 18 and 19 for the data lines of the memories 1 and 2, respectively, and by which the setting device 15 and the transfer transistors 9 are controlled. The device 15 is supplied with suitable control signals from the decoder 12 and the process control 16, for furnishing the control gate voltages at the proper time on the part of the device 15.

To erase a lower-order counter region and the associated higher-order check bit, the erase voltage furnished via the device 15 along the line 11 is delivered to the appropriate control gate terminals via the transfer transistors 10 and 9. The transistor 10 is controlled through the address line 25 and the transistor 9 is controlled by the device 16. If only the check bit is erased, the transistor 10 is triggered and the transistor 9 is blocked. Write operations are suppressed upon detection of an incompletely written memory cell by the decoder 12 in that the programming amplifiers 18 and 19 are turned off.

The following voltages are established on the line 11 by the device 15: in a read-out operation prior to a writing phase, a higher reading voltage than in reading prior to the erase operation; in the first of these reading operations preferably a reading voltage that is above the mean reading voltage and in the latter reading operation a reading voltage below it. For the read-out of data, for instance for outputting data to the user, a reading voltage below the high reading voltage is used, preferably the mean reading voltage. By way of example, an erase voltage of 20 V is generated along the line 11 for an erase operation, while for writing the voltage is 0 V.

In the following table, the operating instances to be distinguished by the decoder 12 are shown, on the basis of which corresponding control signals are to be generated to the output lines 20 and 21 of the device 12, resulting in the corresponding operating modes shown in the table. The input variables evaluated here for this purpose are the carry bit of a counter stage of the memory 1, which is available along the line 22, and the associated check bit, which is available along the line 23.

| | Decoding prior to a writing phase | | |
|---|---|---|---|
| | Carry bit | Check bit | Action during the writing phase |
| (a) | 1 | 1 | Writing of carry bit and check bit |
| (b) | 0 | 0 | No writing operation |
| (c) | 0 | 1 | No writing operation, or cancelling only of the check bit |
| (d) | 1 | 0 | No writing operation or cancelling only of the check bit |

| | Decoding prior to a erasure phase | | |
|---|---|---|---|
| | Carry bit | Check bit | Action during the writing phase |
| (e) | 0 | 0 | erasure of the lower-order counter region and of the check bit |
| (f) | 1 | 1 | No erasure or erasure only of the check bit |
| (g) | 0 | 1 | No erasure or erasure only of the check bit |
| (h) | 1 | 0 | No erasure or erasure only of the check bit |

I claim:

1. A method for debiting an integrable electronic circuit of a debit card, wherein the electronic circuit comprises a nonvolatile, electrically erasable and writable counter memory operated as a multi-stage counter with counter stages, and wherein the electronic circuit further comprises a nonvolatile, electrically erasable and writable check memory having check memory regions associated with respective counter stages of the counter memory, the method which comprises:

defining at least two different weighting thresholds, reading at least one memory cell of each of the counter memory and the check memory with the at least two different weighting thresholds, and controlling a counting process in the counter memory as a function of results obtained in the reading step.

2. The method according to claim 1, which comprises defining different weighting thresholds by adding different reading voltages to a control gate of a respective one of the nonvolatile memory cells.

3. The method according to claim 2, which further comprises evaluating by reading at a first reading voltage prior to writing a carry bit and an associated check bit, and reading at a second reading voltage prior to erasing a low-order counter stage and the associated check bit.

4. The method according to claim 3, wherein n-channel type memory cells with a floating gate are used in at least one of the counter memory and the check memory and the method further comprises adjusting the first reading voltage higher than the second reading voltage.

5. The method according to claim 1, which further comprises, when outputting to a user, reading-out a memory cell of the counter memory with a mean weighting threshold.

6. The method according to claim 3, which further comprises, if the carry bit and the check bit are evaluated in the evaluating step as having been written, suppressing a writing process for the carry bit and the check bit during a writing phase.

7. The method according to claim 3, which further comprises, if one of the carry bit and the check bit is evaluated in the evaluating step as having been written, suppressing a writing process for the check bit during a writing phase.

8. The method according to claim 3, which further comprises, if one of the carry bit and the check bit is evaluated in the evaluating step as having been written, suppressing a writing process for the check bit and erasing the check bit during a writing phase.

9. The method according to claim 3, which further comprises, if the carry bit is erased and the check bit is written, suppressing a writing process for the check bit during a writing phase and writing the carry bit.

* * * * *